Dec. 1, 1925.
W. W. COBLENTZ
1,563,557
OPTICAL MEANS FOR RECTIFYING ALTERNATING CURRENTS
Filed Sept. 18, 1923
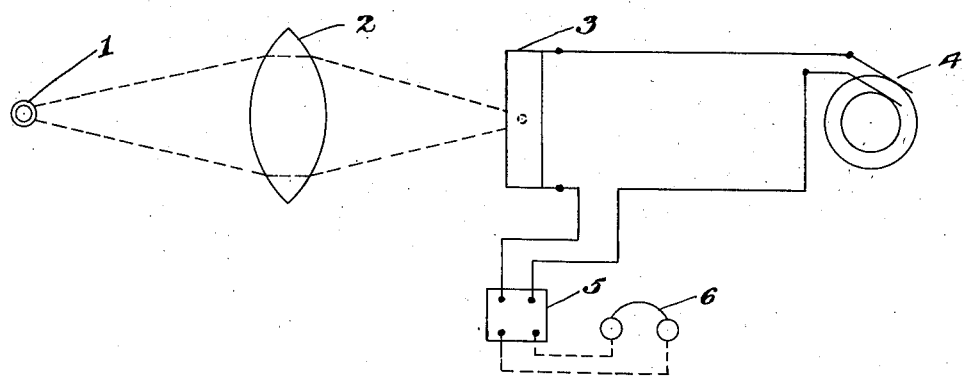
INVENTOR
William W. Coblentz
BY Robert H Young
ATTORNEY Patented Dec. 1, 1925.

1,563,557

UNITED STATES PATENT OFFICE.

WILLIAM W. COBLENTZ, OF WASHINGTON, DISTRICT OF COLUMBIA.

OPTICAL MEANS FOR RECTIFYING ALTERNATING CURRENTS.

Application filed September 18, 1923. Serial No. 663,412.

*To all whom it may concern:*

Be it known that I, WILLIAM W. COBLENTZ, a citizen of the United States, residing at Washington, in the District of Columbia, have invented certain new and useful Improvements in Optical Means for Rectifying Alternating Currents, of which the following is a specification.

This invention relates to optical means for rectifying alternating currents.

It has been found that certain crystalline substances have the surface property of offering less resistance to the flow of electric current therethrough in one direction than in the reverse direction and have been used in rectifying alternating currents by being used in contact devices interposed in such circuits. In the course of extensive experimentation with various light reactive substances to serve as resistances in radiophonic signaling, I have discovered that some substances, notably molybdenite or molybdenum sulphide, exhibit properties inherent in the body of the crystals themselves which peculiarly adapt them to use in rectifying alternating currents, more so than the ordinary crystalline substances referred to.

I have found that certain samples of molybdenite are more efficient rectifiers than others and attribute this to the coincidence in such samples of spots or loci which are photoelectrically and actinoelectrically sensitive because it has developed that samples having either photoelectrically or actinoelectrically sensitive spots or samples having both kinds of spots, but not in close coincidence with one another, do not as efficiently rectify alternating currents. The so-called "spots" or "loci" of photoelectrical and thermoelectrical sensitivity have been found to have inherent unidirectional or selective conductivity when exposed to thermal radiation or "light", more particularly sunlight. The photoelectrical reaction furthermore was found to be present to a more marked degree in certain samples only when the electric current passed therethrough in one direction and was practically not noticeable when the current passed therethrough in the opposite direction. I believe the reason for this latter phenomena is that the light exposure of the substance sets up inside the substance an actinoelectric current of a certain fixed direction which serves to buck impressed current of opposite direction and strengthens impressed current of the same direction. This is shown to be true by evidences of direct generation of current actinoelectrically when the substance is similarly exposed and there is no impressed current. Because of the inherent selective conductivity of the substance, instead of obtaining the same photoelectrically reaction with the impressed current in one direction as with it in the opposite direction there is a difference of as much as two to three times the minimum current between the maximum and minimum transmitted currents when the impressed current is reversed. The phenomena referred to were all observed when the substance, molybdenite, was exposed to visible and short wave length invisible, thermal radiant energy.

In the accompanying drawing, I have illustrated diagrammatically a form of apparatus by means of which rectification of alternating currents may be secured in the manner hereinbefore generally stated.

Referring to the drawing, 1 represents a suitable steady or varying and controllable source of light from which rays are transmitted to be focused by a lens 2 upon the light reactive body 3 of molybdenite or some other substance having substantially the same properties.

The body 3 is interposed in a circuit including an alternating current generator 4 and any form of apparatus 5 which it is desired to operate with direct current, that is, rectified alternating current.

The operation of the light upon the reactive body sets up a current in the circuit opposite in direction to certain alternations produced by the generator, but the same in direction with the others. This photoelectric current, as it is called, overbalances the one set of alternations so that a rectifying of the current takes place and a pulsating direct current is secured, which can be readily detected if a telephone receiver 6 is connected in the circuit. With a varying or controlled projection of light, the rectifying current may be used in signalling where the light is the transmitting agent. Attention is called to the fact that some samples of molybdenite have been found to rectify alternating current when in the dark and to be unaffected by light. However the present invention is particularly concerned with those samples which are light reactive and are therefore useful in signalling with light.

I claim:

1. Means for rectifying alternating currents comprising a body interposed in an alternating current circuit and made of a substance having inherent unidirectional selective conductivity when exposed to light, and means for exposing said body to light.

2. Means for rectifying alternating currents, comprising a light reactive body interposed in an alternating current circuit, said body being inherently photoelectrically reactive only when current is passed therethrough in a certain direction, and means for exposing said body to light.

3. Means for signalling by rectifying alternating currents comprising a light reactive resistance, having substantially the properties of light-reactive molybdenite, interposed in an alternating current circuit, and means for exposing said resistance to thermal radiant energy having substantially the properties of sun-light, the exposure being in accordance with the signal to be transmitted.

4. Means for rectifying alternating currents, comprising a light reactive resistance interposed in an alternating current circuit, said resistance being coincidentally photoelectrically and actinoelectrically sensitive, and means for exposing said resistance to light.

5. Means for rectifying alternating currents comprising a molybdenite body interposed in an alternating current circuit, said molybdenite body being coincidentally photoelectrically and actinoelectrically sensitive, and means for exposing said body to light.

In testimony whereof I affix my signature.

WILLIAM W. COBLENTZ.